June 18, 1940.  E. B. ANDERSON  2,204,745
UNIVERSAL JOINT
Filed Feb. 23, 1938
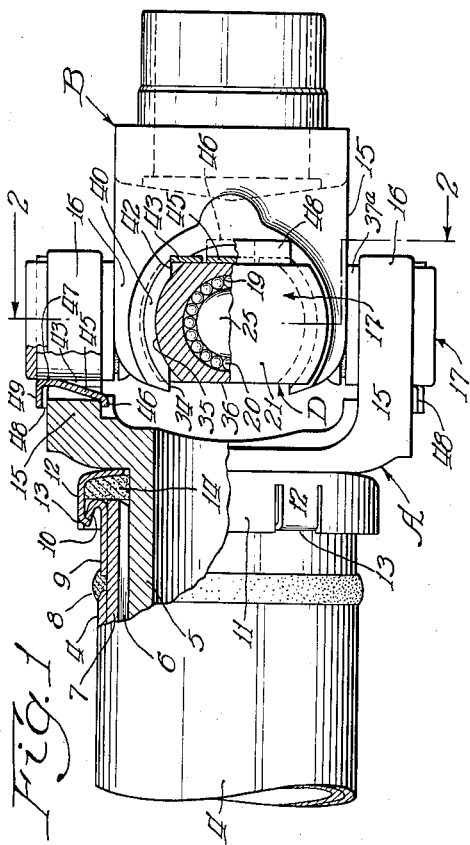
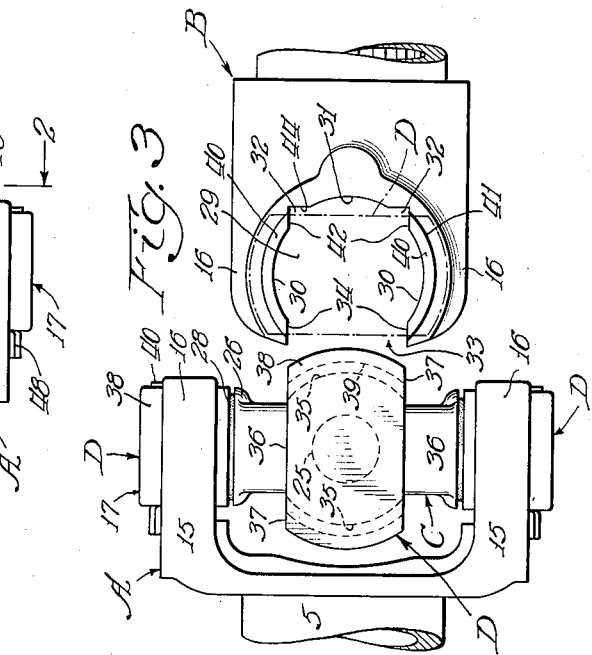
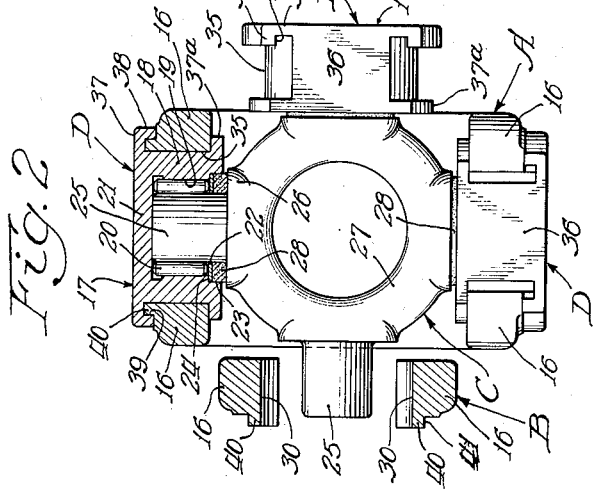
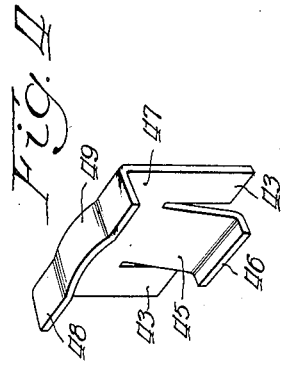
Inventor:
Edmund B. Anderson
By: Edward C. Fitzbaugh
Atty.

Patented June 18, 1940

2,204,745

UNITED STATES PATENT OFFICE 2,204,745

UNIVERSAL JOINT

Edmund B. Anderson, Rockford, Ill., assignor to Borg-Warner Corporation, Chicago, Ill., a corporation of Illinois Application February 23, 1938, Serial No. 191,941

16 Claims. (Cl. 64—17)

This invention relates to universal joints, and has as its general object to provide a universal joint of a type that may be rapidly and easily assembled and disassembled.

Attempts have been made to provide a satisfactory universal joint capable of being readily disjointed, in which the yokes, instead of being of the conventional type in which the trunnion bearings are mounted in ring-shaped bearing supports, have their ends bifurcated so that the bearings may be assembled by simply slipping them between the furcations of the arms. However, such efforts have not met with any satisfactory degree of success for the reason that all of the load, at any given time, was imposed upon one only of the furcations of each of the arms, and since the average universal joint as embodied, for example, in a motor vehicle drive system, is driven a major percentage of the time in one direction, joints of such type have been found to break down at the yoke arm furcations on the forward drive sides of the arms.

In attempting to remedy this situation, those furcations which are subject to the major portion of the load, have been repeatedly increased in strength and thickness, so that a very unsymmetrical joint has been the result. Such a joint is undesirable, not only from the standpoint of appearance, but also because it is necessarily larger in diameter than a joint in which the yoke arms are symmetrical. Furthermore, resorting to such measures increases the cost of materials and manufacture, and produces a joint which possesses high rotational inertia and is unduly bulky as to size, and therefore undesirable in contrast to one that is lighter in rotating mass and more compact.

My invention aims to provide a universal joint having all the advantages of ready disjointability without the attendant disadvantages above stated; one that is perfectly symmetrical, and one that is as light and yet as strong as any conventional joint of the type in which the trunnion bearing is completely surrounded by a unitary bearing supporting ring.

Another object of the invention is to provide an improved arrangement for securing the trunnion bearings against accidental detachment from the bifurcated yoke arms, such means being of minimum mass, being symmetrically arranged and centered with respect to the yoke arm, and being adapted to practically instant manipulation.

Other objects, the advantages and uses of the invention will become apparent after reading the following specification and claims, and after consideration of the drawing forming a part of the specification, wherein:

Fig. 1 is a plan view or side elevation, partly in section, of a universal joint embodying my invention;

Fig. 2 is a transverse sectional view thereof taken on the line 2—2 of Fig. 1;

Fig. 3 is a plan view or side elevation of the same, parts thereof being shown partially disassembled and drawn apart; and Fig. 4 is a perspective view of the securing element.

The universal joint which has been selected for the purpose of illustrating one form in which the invention may be embodied, comprises a pair of yokes A and B joined by a spider C, the yoke A being adapted to be attached to a tubular propeller shaft 4, and the yoke B being adapted to be attached to an axle driving shaft or spindle (or to a transmission drive shaft) of a motor vehicle. The yoke A may include a tubular shank portion 5 having a splined connection at 6 with an internally splined sleeve 7 secured in the end of the propeller shaft 4, as by welding at 8, whereby the shank 5 is telescopically mounted in the propeller shaft 4 for relative longitudinal sliding movement. A grease seal may be provided for this slidable connection, in the form of a ferrule 9 receiving and secured upon the end of the sleeve 7 as by the ring of welding 8, a curled flange 10 on the end of said ferrule 9, and a collar 11 having spring fingers 12 provided with hooked portions 13 adapted to engage the edge of the flange 10. A ring 14 of packing material, such as felt, may be engaged between the collar 11 and the end of the sleeve 7.

According to the present invention, the arms 15 of both yokes A and B, or of either of them, are bifurcated to form furcations 16 between which the bearing members, herein referred to generally by the reference character D, are detachably received. The bearing members D include cup-shaped bearing holders 17 each including an annular wall 18 having a cylindrical bore 19, and pin bearing elements 20 mounted in the bore 19. One end of each pin bearing element 20 bears against the outer end or head portion 21 of the holder 17, and the other end thereof bears against a retaining washer 22 which is frictionally engaged in a slightly enlarged region 23 of the bore 19, and positioned against a shoulder 24 formed between the bore 19 and the enlarged region 23 thereof. The bearing member D is adapted to receive a trunnion 25 of the spider C, and may be separated from the shouldered region 26 thereof which joins the trunnion 25 to the ring-shaped central portion 27 thereof, by a thrust washer 28 of leather, fiber or the like. When the bearing member D is disconnected from the trunnion 25, the pin bearing elements 20 are retained against dislodgement from the bar 19 in a well known manner by their contacting engagement with each other.

The recess 29 defined between the furcations 16 is substantially cylindrical, comprising arc-shaped side faces 30 and an arc-shaped bottom face 31 separated by notches 32. An entry space 33 is formed between two parallel flat faces 34 at the tips of the furcations 16. The arc-shaped faces 30 and 31 form sections of a truly cylindrical surface aggregating roughly about 270 degrees.

The bearing holder 17 has two opposed arc-shaped end faces 35 forming sections of a cylindrical surface, and separated by two flat parallel side faces 36. The arc-shaped end faces 35 are formed on a diameter just a trifle smaller than that of the faces 30 and 31 of the recess 29 in the yoke arm 15, whereby the bearing holder 17 may be rotatably received in the recess 29.

The side faces 36 of the bearing holder 17 are spaced apart a distance just a trifle less than the distance between the faces 34 of the recess 29, whereby, when the bearing holder is positioned in alignment with the entry space 33, with its side faces 36 parallel to the faces 34, it may be inserted through the entry space 33 into the recess 29 until its advancing end face 35 contacts the arc-shaped face 31 of the recess 29. The relation of the parts before joining is shown in Fig. 3.

The bearing holder 17 is formed with diametrically opposed pairs of spaced wing portions 37 and 37a projecting from its end faces 35. Projecting from the ends of the wing portions 37 toward the wing portions 37a are curved flanges 38, the inner surfaces 39 of which are cylindrical sections coaxial with the axis of the bore 19.

Projecting laterally from the outer side faces 29 of the furcations 16 are a pair of lugs 40, the inner faces of which are defined by the curved faces 30, the outer faces 41 of which are curved and coaxial with the surfaces 30, and the ends of which are defined by the flat entry faces 34 and the faces 42 of the notches 32. The wing portions 37 and flanges 38, together form hook members that are adapted to snugly receive the lugs 40. The wing portions 37 and 37a are spaced so as to snugly receive between them a furcation 16, as shown in Fig. 2.

The faces 42 are disposed in the same parallel planes as the faces 34, whereby, as the bearing holder D is moved into the recess 29, the flanges 38 may pass between first the faces 34 and then the faces 42 so as to allow the advance end 35 of the bearing holder to bottom against the curved face 31 of the yoke arm 15. When this position has been reached, the bearing member D may be rotated 90 degrees to the position shown in dotted lines in Fig. 3, the end faces 35 of the bearing member being received by the curved faces 30 of the furcations 16, the flanges 38 sliding around and embracing the lugs 40, and the pairs of wing portions 37 and 37a each embracing a furcation 16.

The inner faces 39 of the flanges 38 are formed to fit the outer faces 41 of the lugs 40 so that when the bearing holder has thus attained its final assembled position, it will constitute a bridging connection between the furcations 16, its flanges 38 hooked over and engaging the lugs 40, as shown in section in Fig. 2. Thus the load imposed upon one furcation 16 through the medium of the spider and spider bearing member, will be transmitted across this bridging connection to the other furcation so as to be distributed between both furcations. The effect will be about the same as if the entire recess 29 were bridged over by a web integral with the arm 15.

Due to the curved shape of the lugs 40 and the hooked members 37, 38, in which they are engaged, strains and stresses will be transmitted not only in a direction at right angles to the major axis of the arm 15, but in diagonal directions as well.

The end faces 35 of the bearing holder will be in abutting engagement with the curved faces 30 of the furcations 16 when the bearing member is in its final assembled position so that the bridging connection is adapted to lock the furcations 16 not only against spreading movement, but against movement toward each other, such as could be caused, for example, by vibration. Thus, it serves to dampen vibration that otherwise would be set up in the furcations 16 of the arm 15, which, like a tuning fork, is readily susceptible to vibration. By thus eliminating vibration, my invention does away with crystallization caused by vibration, which crystallization may be a definite factor in the failure of bifurcated yoke arms of this type.

The bearing holder is locked in its finally assembled position by a locking element in the form of a spring clip, shown in Fig. 4, having a pair of legs 43 receivable in the notches 32, between the bottom faces 44 thereof and a side face 36 of the bearing holder, and a spring lip portion 45 disposed between the legs 43 and biased with relation to the plane thereof, so that its hooked end 46 may engage the inner side of the arm 15 as shown in Fig. 1. The legs 43 are formed by striking the lip 45 from between them, all three being joined by a web portion 47 which is turned over to form a flange 48 adapted to rest upon the outer face of the arm 15. The central region of the flange 48 may be arched upwardly, as at 49, to allow the end of a screw driver to be inserted thereunder for prying the clip loose from its assembled position shown in Fig. 1.

The clip, being in engagement with the notches 32, and engaging the flat face 44 of the bearing holder, will prevent the latter from rotating.

The spring clips are symmetrical with respect to the arms 15, which would not be true with respect to set screws unless two were used, and the clips are much lighter and do not project as set screws would do.

As long as the bearing holder is thus secured in a position extending transversely of the furcations 16, it will be securely held by the converging end regions of the furcations against detachment from the yoke in a direction parallel to the major axis of the yoke (the axis of sleeve 5, for example) and will be securely held against detachment in the direction of its own axis, by the engagement of the wing portions 37a against the inner faces of the furcations 16.

In assemblying and disassembling the universal joint of my invention, the bearing members are both rotated to the position shown in full lines in Fig. 3, and thence moved into or out of the recesses 29 for bodily moving the two yoke members A and B axially relative to each other.

The bearing members 37 lend themselves readily to manufacturing operations. They may first be formed as lathe products, then their flat faces 36 milled or ground, and these flat faces utilized as guides for passing them through a machine in which the finish machining operations are performed. The curved surfaces 30 and 31 of the arms 15 may be produced by a machining operation and the flat faces 34 and notches 32, by milling.

It will now be apparent that a universal joint constructed in accordance with my invention has maximum strength, coupled with minimum size and weight.

It is of considerable importance that the universal joint designed for a modern passenger automobile be of minimum mass and diameter, thus to reduce rotational inertia and also for the reason that the clearance between the floor and the propeller shaft of the modern passenger vehicle, has been reduced to a minimum dimension as an aid in generally lowering the center of gravity of the vehicle.

My universal joint can be assembled and disassembled with a maximum of ease, and when locked in finally assembled condition, cannot possibly become accidentally disassembled.

I claim:

1. In a universal joint, a yoke having a bifurcated arm, a bearing member received between the furcations of said arm, and means carried by said bearing member and interengaging with means on the respective furcations to constitute said bearing member a bridging connection between said furcations, tying them together so that said furcations will both cooperate in resisting torsional stresses applied against one of them.

2. In a universal joint, a yoke having a bifurcated arm, a bearing holder received between the furcations of said arm, means carried by said bearing holder and interengaging with means on said furcations to constitute said bearing holder a bridging connection between said furcations, tying them together so that said furcations will both cooperate in resisting torsional stresses applied against one of them, and pin bearings carried by said holder and adapted to cooperate with a spider trunnion.

3. In a universal joint, a yoke having a bifurcated arm, a bearing member receivable and rotatable between the furcations of said arm, and means on said bearing member adapted, when the bearing member is thus rotated, to interengage with complementary means on each of said furcations so as to constitute said bearing member a bridging connection between said furcations, tying them together so that said furcations will both cooperate in resisting torsional stresses applied against one of them.

4. In a universal joint, a yoke having a bifurcated arm, a bearing member mounted between the furcations of said arm, said bearing member having laterally extending hooked members adapted to engage portions of the respective furcations of said arm so as to constitute said member a bridging connection between said furcations, tying them together so that said furcations will both cooperate in resisting torsional stresses applied against one of them.

5. In a universal joint, a bearing member, a yoke having a bifurcated arm between the furcations of which said bearing member is detachably receivable, a lug formed on each furcation adjacent the inner edge thereof, and a pair of hooks formed on said bearing member, projecting laterally in oppsite directions, and adapted to embrace and engage said lugs so as to constitute said holder a bridging connection between said furcations, tying them together.

6. In a universal joint, a bearing member, a yoke having a bifurcated arm between the furcations of which said bearing member is detachably receivable and rotatable, a lug formed on each furcation adjacent the inner edge thereof, and a pair of hooks formed on said bearing member, and adapted to embrace and engage said lugs so as to constitute said bearing member a bridging connection between said furcations, tying them together, said hooks comprising wing portions extending radially in opposite directions from the outer end of said bearing member in a plane perpendicular to the axis thereof and arc-shaped flanges projecting from the outer ends of said wing portions parallel to said axis and concentric therewith, and said lugs having engaging faces curved to fit the inner faces of said flanges, whereby engagement of said lugs by said hooks is effected by rotating said bearing member.

7. In a universal joint, a yoke having a bifurcated arm, the furcations of which form a recess having internal cylindro-arc-shaped side faces, the ends of said furcations defining an entry space of less width than the diametrical distance between said faces, a bearing member having diametrically opposed external cylindro-arc-shaped faces receivable and rotatable between said faces of the recess and opposed parallel flat faces receivable through said entry space when said bearing member is in an inserting position, an arc-shaped lug formed on each furcation adjacent said recess, and diametrically opposed arc-shaped hook members formed on said bearing member, adapted to be received between said lugs when said bearing member is in said inserting position and, when said bearing member is rotated to an assembled position at right angles to said inserting position, to embrace and engage said lugs so as to constitute said bearing member a bridging connection between said furcations.

8. In a universal joint, a yoke having a bifurcated arm, the furcations of which form a recess having internal cylindro-arc-shaped side faces, the ends of said furcations defining an entry space of less width than the diametrical distance between said faces, a bearing member having diametrically opposed external cylindro-arc-shaped faces receivable and rotatable between said faces of the recess and opposed parallel flat faces receivable through said entry space when said bearing member is in an inserting position, a lug formed on each furcation, and hook members formed on said bearing member and adapted to be received between said lugs when said bearing member is in said inserting position and when said bearing member is rotated to an assembled position at right angles to said inserting position, to embrace and engage said lugs so as to constitute said bearing member a bridging connection between said furcations.

9. In a universal joint, a yoke having a bifurcated arm, the furcations of which form a recess having internal cylindro-arc-shaped side faces, the ends of said furcations defining an entry space of less width than the diametrical distance between said faces, a bearing member having diametrically opposed external cylindro-arc-shaped faces receivable and rotatable between said faces of the recess and opposed parallel flat faces receivable through said entry space when said bearing member is in an inserting position, and interengaging means on said bearing member and furcations adapted to be engaged and disengaged by rotation of said bearing member between said furcations, and, when engaged, to constitute said bearing member a bridging connection between said furcations, tying them together.

10. In a universal joint, a yoke having a bifurcated arm, the furcations of which form a recess having internal cylindro-arc-shaped side faces, the ends of said furcations defining an entry space of less width than the diametrical distance between said faces, a bearing member having diametrically opposed external cylindro-arc-shaped faces receivable and rotatable between said faces of the recess and opposed parallel flat faces receivable through said entry space when said bearing member is in an inserting position, interengaging means on said bearing member and furcations adapted to be engaged and disengaged by rotation of said bearing member between said furcations, and, when engaged, to constitute said bearing member a bridging connection between said furcations, tying them together, and a spring clip receivable between one of said flat faces and the bottom of said recesses when said bearing member is in said assembled position.

11. In a universal joint, a yoke having a bifurcated arm, a bearing member receivable and rotatable between the furcations of said arm, releasable interengaging means on said bearing member and said furcations serving, when engaged, to constitute said member a bridging connection between said furcations, tying them together so that said furcations will both cooperate in resisting torsional stresses applied against one of them, said member being formed so that rotation thereof will cause said interengaging means to be engaged and released, and means for normally locking said holder against rotation.

12. In a universal joint, a yoke having bifurcated arms, bearing members mounted between the furcations of said arms, a spider having trunnions journalled in said bearing members, said bearing members forming bridging connections between the furcations of the respective arms, tying them together, said members being releasably attached to said furcations so as to allow removal of said bearings and spider from said yoke.

13. In a universal joint, a yoke having bifurcated arms, bearing members comprising holders detachably mounted between the furcations of the respective arms, means carried by each of said holders and interengaging with means on their respective furcations to constitute said holders bridging connections between said respective furcations, tying them together, pin bearings mounted on said holders, and a spider having trunnions received in said bearing members, said spider and bearing members being together detachable from said yoke when said holders are released.

14. In a universal joint, a yoke having a bifurcated arm, a cup-shaped bearing member receivable between the furcations of said arm with its axis at right angles to the plane thereof, wing portions extending radially from the closed end of said bearing member in opposite directions in a plane at right angles to the axis of the bearing member, arc-shaped flanges projecting from the ends of said wing portions toward the other end of the bearing member, parallel to and concentric with the axis of said bearing member, and lugs formed on said furcations adjacent the opposed edges thereof, said lugs being arranged to be engaged by the inner faces of said flanges when said bearing member is in position between said furcations with said wing members extending transversely of said furcations, said bearing member being rotatable between said furcations to a position in which said wing members extend parallel to said furcations, in which position said flanges are receivable between said lugs so that said bearing member may be removed bodily from between said furcations.

15. For a universal joint including a yoke having a bifurcated arm, a cup-shaped bearing member receivable between the furcations of said arm with its axis at right angles to the plane thereof, wing portions extending radially from the closed end of said member in opposite directions in a plane at right angles to the axis of the holder, arc-shaped flanges projecting from the ends of said wing portions toward the other end of the member, parallel to and concentric with the axis of said member, and adapted to engage lugs formed on said furcations.

16. In a universal joint, a yoke having a bifurcated arm, a bearing member received between the furcations of said arm, said bearing member being formed with means adapted to embrace cooperating means formed on the respective furcations so as to constitute said bearing member a bridging connection between said furcations, tying them together so that said furcations will both cooperate in resisting torsional stresses applied against one of them.

EDMUND B. ANDERSON.